(12) United States Patent  (10) Patent No.: US 7,447,501 B2
Karabinis (45) Date of Patent: Nov. 4, 2008

(54) SYSTEMS AND METHODS FOR MONITORING SELECTED TERRESTRIALLY USED SATELLITE FREQUENCY SIGNALS TO REDUCE POTENTIAL INTERFERENCE

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 660 days.

(21) Appl. No.: 11/133,102

(22) Filed: May 19, 2005

(65) Prior Publication Data

US 2005/0208890 A1 Sep. 22, 2005

Related U.S. Application Data

(63) Continuation-in-part of application No. 10/225,616, filed on Aug. 22, 2002, now Pat. No. 7,031,702, and a continuation-in-part of application No. 10/156,363, filed on May 28, 2002, now Pat. No. 7,039,400, and a continuation-in-part of application No. 10/074,097, filed on Feb. 12, 2002, now Pat. No. 6,684,057.

(60) Provisional application No. 60/573,991, filed on May 24, 2004, provisional application No. 60/598,975, filed on Aug. 5, 2004, provisional application No. 60/392,754, filed on Jul. 1, 2002, provisional application No. 60/347,174, filed on Jan. 9, 2002, provisional application No. 60/322,240, filed on Sep. 14, 2001.

(51) Int. Cl.
*H04Q 7/20* (2006.01)
*H04B 7/185* (2006.01)
*H04B 7/19* (2006.01)

(52) U.S. Cl. ............... 455/427; 455/12.1; 455/13.1; 455/13.2

(58) Field of Classification Search ............... 455/12.1, 455/13.1, 427, 428, 429, 430
See application file for complete search history.

(56) References Cited

U.S. PATENT DOCUMENTS 4,901,307 A 2/1990 Gilhousen et al.

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.
Ayyagari et al., "A satellite-augmented cellular network concept", *Wireless Networks*, vol. 4, 1998, pp. 189-198.

*Primary Examiner*—Tilahun B Gesesse
(74) *Attorney, Agent, or Firm*—Myers Bigel Sibley & Sajovec, P.A.

(57) ABSTRACT

A satellite radiotelephone frequency band can be reused terrestrially by an ancillary terrestrial network even within the same satellite cell, using interference reduction/cancellation techniques. An interference reducer is responsive to a space-based component and to an ancillary terrestrial network. The interference reducer is configured to reduce interference in wireless communications that are received by the space-based component from first radiotelephones in the satellite footprint over a satellite radiotelephone frequency band using wireless communications that are received by the ancillary terrestrial network from selected ones of second radiotelephones in the satellite footprint over the satellite radiotelephone frequency band and/or wireless communications that are transmitted by the ancillary terrestrial network to the second radiotelephones in the satellite footprint over the satellite radiotelephone frequency band. The interference reducer may include a prefilter that is configured to determine the selected ones of the second radiotelephones.

47 Claims, 3 Drawing Sheets

U.S. PATENT DOCUMENTS

| | | | |
|---|---|---|---|
| 5,073,900 | A | 12/1991 | Mallinckrodt |
| 5,303,286 | A | 4/1994 | Wiedeman |
| 5,339,330 | A | 8/1994 | Mallinckrodt |
| 5,394,561 | A | 2/1995 | Freeburg |
| 5,444,762 | A * | 8/1995 | Frey et al. .................... 455/431 |
| 5,446,756 | A | 8/1995 | Mallinckrodt |
| 5,448,623 | A | 9/1995 | Wiedeman et al. |
| 5,511,233 | A | 4/1996 | Otten |
| 5,555,257 | A | 9/1996 | Dent |
| 5,584,046 | A | 12/1996 | Martinez et al. |
| 5,612,703 | A | 3/1997 | Mallinckrodt |
| 5,619,525 | A | 4/1997 | Wiedeman et al. |
| 5,631,898 | A | 5/1997 | Dent |
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A * | 12/1998 | Dent ......................... 370/281 |
| 5,848,068 | A * | 12/1998 | Daniel et al. ........... 370/395.43 |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,915,217 | A * | 6/1999 | Wiedeman et al. .......... 455/427 |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,628,919 | B1 | 9/2003 | Curello et al. |
| 6,684,057 | B2 | 1/2004 | Karabinis |
| 6,735,437 | B2 * | 5/2004 | Mayfield et al. ............ 455/427 |
| 6,775,251 | B1 | 8/2004 | Wiedeman |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 * | 5/2005 | Karabinis et al. ........... 455/429 |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 7,155,161 | B2 * | 12/2006 | Regulinski et al. ......... 455/13.1 |
| 7,203,490 | B2 * | 4/2007 | Karabinis et al. ........... 455/428 |
| 7,286,503 | B1 * | 10/2007 | Clarke et al. ............... 370/328 |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0022625 | A1 | 1/2003 | Otten et al. |
| 2003/0054761 | A1 | 3/2003 | Karabinis |
| 2003/0054762 | A1 | 3/2003 | Karabinis |
| 2003/0054814 | A1 | 3/2003 | Karabinis et al. |
| 2003/0054815 | A1 | 3/2003 | Karabinis |
| 2003/0068978 | A1 | 4/2003 | Karabinis et al. |
| 2003/0073436 | A1 | 4/2003 | Karabinis et al. |
| 2003/0149986 | A1 | 8/2003 | Mayfield et al. |
| 2003/0153308 | A1 | 8/2003 | Karabinis |
| 2003/0224785 | A1 | 12/2003 | Karabinis |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0192200 | A1 | 9/2004 | Karabinis |
| 2004/0192293 | A1 | 9/2004 | Karabinis |
| 2004/0192395 | A1 | 9/2004 | Karabinis |
| 2004/0203393 | A1 | 10/2004 | Chen |
| 2004/0203742 | A1 | 10/2004 | Karabinis |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 | 3/2005 | Karabinis |
| 2005/0079816 | A1 * | 4/2005 | Karabinis et al. .......... 455/12.1 |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040659 | A1 | 2/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

* cited by examiner

SYSTEMS AND METHODS FOR MONITORING SELECTED TERRESTRIALLY USED SATELLITE FREQUENCY SIGNALS TO REDUCE POTENTIAL INTERFERENCE

CROSS-REFERENCE TO RELATED APPLICATION

This application claims the benefit of provisional Application No. 60/573,991, filed May 24, 2004, entitled Systems and Methods for Monitoring Selected Terrestrially Reused Satellite Frequency Signals to Reduce Potential Interference and provisional Application No. 60/598,975, filed Aug. 5, 2004, entitled Systems and Methods for Monitoring Terrestrially Reused Satellite Frequency Signals to Reduce Potential Interference. This application also is a continuation-in-part of application Ser. No. 10/225,616, filed Aug. 22, 2002, now U.S. Pat. No. 7,031,702 entitled Additional Systems and Methods For Monitoring Terrestrially Reused Satellite Frequencies To Reduce Potential Interference, which claims the benefit of provisional Application No. 60/392,754, filed Jul. 1, 2002, entitled Additional Systems and Methods for Monitoring Terrestrially Reused Satellite Frequencies to Reduce Potential Interference, and which is itself a continuation-in-part of application Ser. No. 10/156,363, filed May 28, 2002, now U.S. Pat. No. 7,039,400 entitled Systems and Methods For Monitoring Terrestrially Reused Satellite Frequencies To Reduce Potential Interference, which claims the benefit of provisional Application No. 60/347,174, filed Jan. 9, 2002, entitled Monitoring Terrestrially Reused Satellite Frequencies to Reduce Potential Interference, and which is itself a continuation-in-part of application Ser. No. 10/074,097, filed Feb. 12, 2002 (now U.S. Pat. No. 6,684,057), entitled Systems and Methods for Terrestrial Reuse of Cellular Satellite Frequency Spectrum, which claims the benefit of provisional Application No. 60/322,240, filed Sep. 14, 2001, entitled Systems and Methods for Terrestrial Re-Use of Mobile Satellite Spectrum. All of the above-mentioned applications are assigned to the assignee of the present application, the disclosures of all of which are hereby incorporated herein by reference in their entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single antenna pattern (beam) covering an entire area served by the system. Alternatively, in cellular satellite radiotelephone communications systems and methods, multiple antenna patterns (beams or cells) are provided, each of which can serve substantially distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "wireless terminal" or simply as a "terminal". As used herein, the term(s) "radiotelephone", "radioterminal", "wireless terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s).

Terrestrial networks can enhance cellular satellite radiotelephone system availability, efficiency and/or economic viability by terrestrially using at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The terrestrial use of at least some of the satellite system frequencies can reduce or eliminate this potential problem.

Moreover, the capacity of the overall system may be increased by the introduction of terrestrial frequency use of the satellite system frequencies, since terrestrial frequency use may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial use of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using at least some of the same satellite frequency band and using substantially the same air interface for both terrestrial and satellite communications may be cost effective and/or aesthetically appealing. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to the present inventor Karabinis, entitled Satellite System Utilizing a Plurality of Air Interface Standards and Method Employing Same.

Satellite radioterminal communications systems and methods that may employ terrestrial use of satellite frequencies are described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference; and Published U.S. Patent Application No. U.S. 2003/0054761 to Karabinis, entitled Spatial Guardbands for Terrestrial Reuse of Satellite Frequencies; U.S. 2003/0054814 to Karabinis et al., entitled Systems and Methods for Monitoring Terrestrially Reused Satellite Frequencies to Reduce Potential Interference; U.S. 2003/0073436 to Karabinis et al., entitled Additional Systems and Methods for Monitoring Terrestrially Reused Satellite Frequencies to Reduce Potential Interference; U.S. 2003/0054762 to Karabinis, entitled Multi-Band/Multi-Mode Satellite Radiotelephone Communications Systems and Methods; U.S. 2003/0224785 to Karabinis, entitled Systems and Methods for Reducing Satellite Feeder Link Bandwidth/Carriers In Cellular Satellite Systems; U.S. 2002/0041575 to Karabinis et al., entitled Coordinated Satellite-Terrestrial Frequency Reuse; U.S. 2003/0068978 to Karabinis et al., entitled Space-Based Network Architectures for Satellite Radiotelephone Systems; U.S. 2003/0153308 to Karabinis, entitled Staggered Sectorization for Terrestrial Reuse of Satellite Frequencies; and U.S. 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radiotelephone systems and methods may employ interference cancellation techniques to allow terrestrial use of satellite frequencies. For example, as described in U.S. Pat. No. 6,684,057 to Karabinis, cited above, a satellite radiotelephone frequency can be reused terrestrially by an ancillary terrestrial network even within the same satellite cell, using interference cancellation techniques. Moreover, the ancillary terrestrial network can use a modified range of satellite band forward link frequencies for transmission, to reduce interference with out-of-band receivers. A modified range of satellite band forward link frequencies that is used by the ancillary terrestrial network can include only a subset of the standard satellite band forward link frequencies to provide a guard band, can include power levels that monotonically decrease as a function of increasing frequency and/or can include two or more contiguous slots per frame that are left unoccupied and/or are transmitted at reduced maximum power. Time division duplex operation of the ancillary terrestrial network may also be provided over at least a portion of satellite band return frequencies. Full or partial reverse mode operation of the ancillary terrestrial network also may be provided, where at least some of the forward link and return link frequencies are interchanged with the conventional satellite forward link and reverse link frequencies. See the Abstract of U.S. Pat. No. 6,684,057.

Other radiotelephone systems and methods can monitor terrestrial use of satellite-band frequencies to reduce potential interference. For example, as described in Published U.S. Patent Application No. U.S. 2003/0054814 A1, cited above, radiation by an ancillary terrestrial network, and/or satellite radiotelephones that communicate therewith are monitored and controlled, to reduce and preferably prevent intra-system interference and/or interference with other satellite radiotelephone systems. In particular, a satellite radiotelephone system includes a space-based component that is configured to wirelessly communicate with first radiotelephones in a satellite footprint over a satellite radiotelephone frequency band, and an ancillary terrestrial network that is configured to wirelessly communicate with second radiotelephones in the satellite footprint over at least some of the satellite radiotelephone frequency band, to thereby terrestrially reuse the at least some of the satellite radiotelephone frequency band. Wireless radiation by the ancillary terrestrial network and/or the second radiotelephones at the space-based component is monitored, and the radiation by the ancillary terrestrial network and/or the plurality of second radiotelephones is adjusted in response to the monitoring. Intra-system interference and/or interference with other satellite systems thereby may be reduced or prevented. See the Abstract of U.S. Published Patent Application U.S. 2003/0054814 A1.

Finally, additional systems and methods may be used to monitor terrestrially used satellite frequencies to reduce potential interference. For example, as described in Published U.S. Patent Application No. U.S. 2003/0073436 A1, cited above, a satellite radiotelephone system includes a space-based component, an ancillary terrestrial network, a monitor and a controller. The space-based component is configured to wirelessly communicate with radiotelephones in a satellite footprint over a satellite radiotelephone frequency band. The satellite footprint is divided into satellite cells in which subsets of the satellite radiotelephone frequency band are spatially reused in a spatial reuse pattern. The ancillary terrestrial network is configured to wirelessly communicate with radiotelephones in the satellite footprint over at least some of the satellite radiotelephone frequency band, to thereby terrestrially reuse the at least some of the satellite radiotelephone frequency band. The monitor is configured to monitor wireless radiation at the space-based component that is produced by the ancillary terrestrial network and/or the radiotelephones in satellite cells that adjoin a satellite cell and/or in the satellite cell, in at least part of the subset of the satellite radiotelephone frequency band that is assigned to the satellite cell for space-based component communications. The controller is configured to adjust the radiation by the ancillary terrestrial network and/or the radiotelephones, in response to the monitor. See the Abstract of U.S. Published Patent Application U.S. 2003/0073436 A1.

SUMMARY OF THE INVENTION

Some embodiments of the present invention monitor selective terrestrially used satellite frequency signals to reduce potential interference. In particular, a satellite radiotelephone system according to some embodiments of the present invention includes a space-based component that is configured to receive wireless communications from a plurality of first radiotelephones in a satellite footprint over a satellite radiotelephone frequency band. An ancillary terrestrial network is configured to receive wireless communications from a plurality of second radiotelephones in the satellite footprint over the satellite radiotelephone frequency band. The space-based component also receives the wireless communications from the second radiotelephones and/or the ancillary terrestrial network in the satellite footprint over the satellite radiotelephone frequency band as interference, along with the wireless communications that are received from the first radiotelephones in the satellite footprint over the satellite radiotelephone frequency band. An interference reducer is responsive to the space-based component and to the ancillary terrestrial network. The interference reducer is configured to reduce the interference in the wireless communications that are received by the space-based component from the first radiotelephones in the satellite footprint over the satellite radiotelephone frequency band, using the wireless communications that are received by the ancillary terrestrial network from selected ones of the second radiotelephones in the satellite footprint over the satellite radiotelephone frequency band and/or the wireless communications that are transmitted from the ancillary terrestrial network to at least some of the second radiotelephones.

In some embodiments, the interference reducer comprises a prefilter that is configured to determine the selected ones of the second radiotelephones. In some embodiments, the prefilter is configured to determine the selected ones of the second radiotelephones based on a measure of signal strength received by the plurality of second radiotelephones from the space-based component. In other embodiments, the prefilter is configured to determine the selected ones of the second radiotelephones based on a random/pseudo-random selection, a percentage of the plurality of second radiotelephones, a geographic location of the second radiotelephones and/or a likelihood that the emissions of the second radiotelephones will cause interference with the wireless communications that are received by the space-based component from the first radiotelephone(s). In some embodiments, the prefilter is configured to determine the selected ones of the second radiotelephones based on a measure of signal strength received by the plurality of second radiotelephones from the space-based component exceeding a threshold.

In some embodiments, the second radiotelephones are configured to transmit to the ancillary terrestrial network and/or to the space-based component, the measure of signal strength received from the space-based component.

In other embodiments, the ancillary terrestrial network is configured to transmit to the interference reducer a measure of the wireless signals received from one or more second radiotelephones, before and/or after demodulation, de-spreading and/or regeneration by the ancillary terrestrial network and/or to transmit to the interference reducer a measure of the wireless signals transmitted by the ancillary terrestrial network to at least some of the second radiotelephones before and/or after modulation and/or spreading. In some embodiments, the interference reducer and/or another system element is configured to re-modulate and/or re-spread the measure of the wireless signals received from the ancillary terrestrial network before being used by the interference reducer. In some embodiments, the interference reducer and/or the other system element is/are configured to re-modulate and/or re-spread the measure of the wireless signals received from the ancillary terrestrial network to form a modulated and/or spread-spectrum chip-level signal.

In some embodiments of the present invention, the ancillary terrestrial network is closer to the second radiotelephones than to the space-based component, such that the wireless communications from the second radiotelephones are received by the ancillary terrestrial network prior to reception by the space-based component. The interference reducer is configured to generate at least one delayed replica of the wireless communications from the selected ones of the second radiotelephones that are received by the ancillary terrestrial network and to subtract the delayed replica of the wireless communications of the selected ones of the second radiotelephones that are received by the ancillary terrestrial network from the wireless communications that are received from the space-based component. In some embodiments, the interference reducer comprises an adaptive interference canceller. Moreover, in some embodiments, the interference reducer is at least partially included in the satellite gateway.

It will be understood by those having skill in the art that the above embodiments have been described primarily with respect to satellite radiotelephone systems. However, other embodiments of the present invention can provide components of a satellite radiotelephone system such as a gateway, a prefiltering unit, radiotelephones and/or an ancillary terrestrial network. Moreover, analogous method embodiments also may be provided according to other embodiments of the present invention.

DETAILED DESCRIPTION

Figure 1:
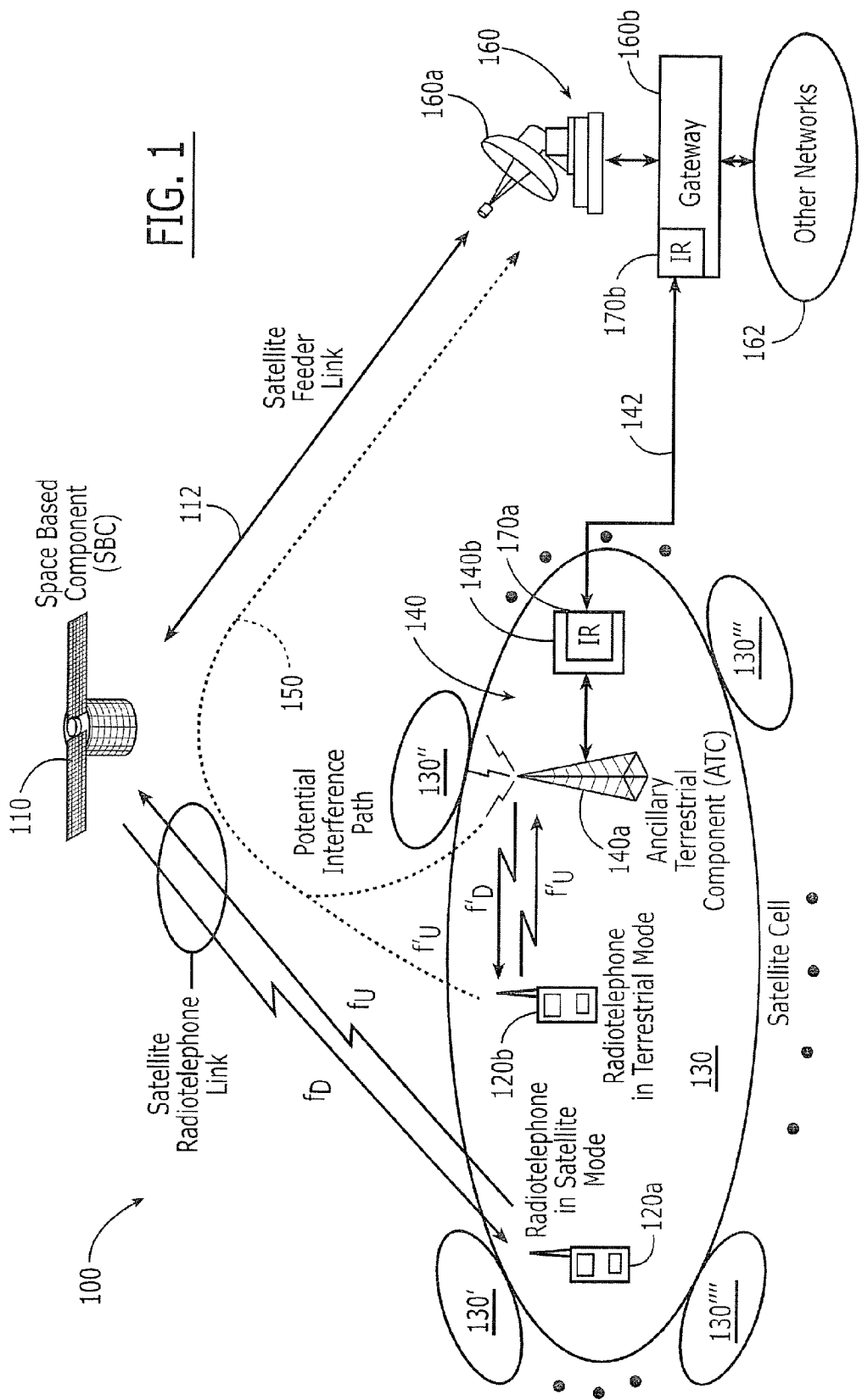
FIG. 1 is a schematic diagram of cellular radiotelephone systems, methods and components according to exemplary embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being compared substantially overlap in frequency, but that there may be some areas of non-overlap, for example at a band end(s). "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

FIG. 1 is a schematic diagram of cellular satellite radiotelephone (or radioterminal) systems, methods and components according to various exemplary embodiments of the invention. As shown in FIG. 1, these cellular satellite radiotelephone systems and methods 100 include at least one Space-Based Component (SBC) 110, such as a satellite. The space-based component 110 may be configured to transmit wireless communications to a plurality of radiotelephones 120a in a satellite footprint comprising one or more satellite radiotelephone cells, indicated in FIG. 1 by 130-130'''', over one or more satellite radiotelephone forward service link (downlink) frequencies $f_D$. The space-based component 110 may also be configured to receive wireless communications from, for example, a first radiotelephone 120a, in the satellite radiotelephone cell 130, over a satellite radiotelephone return service link (uplink) frequency or frequencies $f_U$. An ancillary terrestrial network, comprising at least one ancillary terrestrial component 140, which may include an antenna 140a and an electronics system 140b, is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives at least some of the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U = f_U$, because, in that case, the same return link frequency would be used for space-based component and ancillary terrestrial component communications over the same satellite radiotelephone cell (intra-satellite cell frequency reuse by the ancillary terrestrial component), and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the transmissions of the second radiotelephone 120b to the ancillary terrestrial component 140 in the satellite radiotelephone cell 130 over the satellite radiotelephone frequency $f'_U$ and/or by the transmissions of the ancillary terrestrial component 140 to the second radiotelephone 120b. The interference reducer 170a and/or 170b uses a measure of the wireless communications that are transmitted by the second radiotelephone 120b, intended for the ancillary terrestrial component 140, in the satellite radiotelephone cell 130 using the satellite radiotelephone frequency $f'_U$ and/or a measure of the wireless communications that are transmitted by the ancillary terrestrial component 140 intended for the second radiotelephone 120b to reduce the interference from the wireless communications that are received by the space-based component 110.

In embodiments of FIG. 1, the ancillary terrestrial component 140 is physically closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference reduction signal comprising, for example, a measure of at least one delayed replica of the wireless communications from the second radiotelephone(s) 120b that are received by the ancillary terrestrial component 140 and/or a measure of at least one delayed replica of the wireless communications that are transmitted by the ancillary terrestrial component 140 to at least some of the second radiotelephones 120b and to subtract the measure of the at least one delayed replica of the wireless communications from the second radiotelephone(s) 120b that are received by the ancillary terrestrial component 140 and/or the measure of the at least one delayed replica of the wireless communications that are transmitted by the ancillary terrestrial component 140 to the at least some of the second radiotelephones 120b from the wireless communications that are received from the space-based component 110. Elements of the interference reduction signal(s) may be transmitted from the ancillary terrestrial component 140 to the gateway 160 and/or interference reducer 170b over link 142 and/or any other link.

Thus, adaptive interference reduction techniques may be used to at least partially cancel the interfering signal so that the same, or other, satellite radiotelephone uplink frequency can be used in a given cell for communications by radiotelephones 120 with the satellite 110 and with the ancillary terrestrial component 140. Accordingly, in some embodiments, all frequencies that are assigned to a given cell 130 may be used for both radiotelephone 120 communications with the space-based component 110 and with the ancillary terrestrial component 140. In other embodiments, systems may avoid terrestrial reuse of frequencies within a given satellite cell that are being used within the given satellite cell for satellite communications. Stated differently, in some embodiments, only frequencies used by other satellite cells may be candidates for terrestrial reuse within a given satellite cell and beam-to-beam spatial isolation that is provided by the satellite system may be relied upon to reduce or minimize a level of interference from the terrestrial operations into the satellite operations. In contrast, other embodiments of the invention can use an interference reducer to allow all frequencies assigned to a satellite cell to be used terrestrially and for satellite radiotelephone communications.

Embodiments according to FIG. 1 may arise from a realization that the return link signal from the second radiotelephone 120b at $f'_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as, for example, a demodulated and/or regenerated received ancillary terrestrial component signal, can be sent to the satellite gateway 160b by the interference reducer 170a at the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal may be subtracted from the aggregate received satellite signal at frequency $f'_U$ that contains desired as well as interference signals. Thus, the interference cancellation need not degrade the signal-to-noise ratio of the desired signal at the gateway 160, in that a regenerated (noise-free) terrestrial signal, for example, as regenerated by the ancillary terrestrial component 140, can be used to perform interference suppression.

Figure 2:
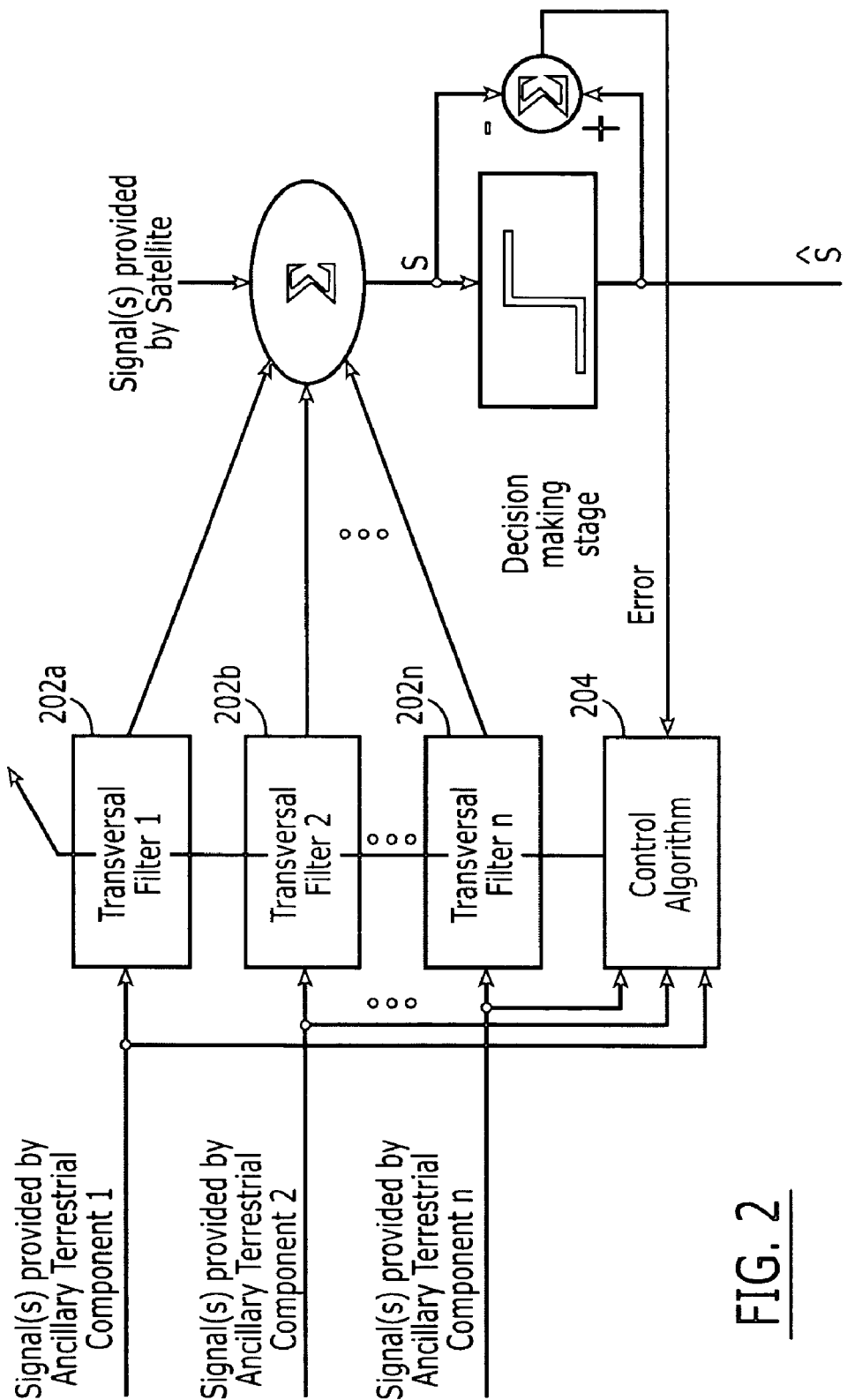
FIG. 2 is a block diagram of adaptive interference reducers according to exemplary embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a-202n. Adaptive algorithms, such as Least Mean Squared Error (LMSE), Recursive Least Squares (RLS) Kalman, Fast Kalman, Zero Forcing and/or various combinations thereof or other techniques may be used. It will be understood by those having skill in the art that the architecture of FIG. 2 may be used with, for example, an LMSE algorithm. However, it also will be understood by those having skill in the art that conventional architectural modifications may be made to facilitate other control algorithms such as Zero Forcing. It will also be understood by those of skill in the art that although FIG. 2 illustrates a decision-directed approach, the control algorithm(s) 204 may not rely on decisions but may instead use a priori known to the receiver information that may be included and/or provided by a desired signal waveform component, such as, for example, a pre-amble and/or a mid-amble data sequence and/or a pilot signal. In some embodiments, the control algorithm(s) 204 may use both receiver decisions (as illustrated in FIG. 2) and a priori known to the receiver information that may be included in the desired signal waveform.

Some embodiments of the present invention also may arise from realization that systems/methods as shown in FIG. 1 may employ a network of hundreds, thousands or tens of thousands of ancillary terrestrial components 140 and one or more space-based components 110 that are configured to communicate with thousands, tens of thousands, hundreds of thousands or more of first radiotelephones 120a in satellite mode and second radiotelephones 120b in terrestrial mode. In such large scale systems, it may be burdensome, costly and/or otherwise undesirable to provide interference reduction for all signals generated by large numbers of the first and second radiotelephones 120a and 120b, respectively. Accordingly, some embodiments of the present invention can provide prefiltering that is associated with the interference reducer 170a and/or 170b. Prefiltering methods and/or systems as described below may be provided at least partly in the interference reducer 170a in an ancillary terrestrial component electronic system 140b, at least partially in the interference reducer 170b in the gateway electronics system 160b and/or at least partially separate therefrom. The prefilter is responsive to the signals that are generated and/or received by the ancillary terrestrial components 140 based on communications with the plurality of radiotelephones 120b in terrestrial mode, to prefilter selected signals from the second plurality of radiotelephones 120b, so that they are not used for interference reduction purposes. Accordingly, only selected terrestrially reused satellite frequency signals are used to reduce potential interference. The load on the adaptive interference canceller, such as the adaptive interference canceller of FIG. 2, and/or the dimensionality (n) thereof, may thereby be reduced.

Figure 3:
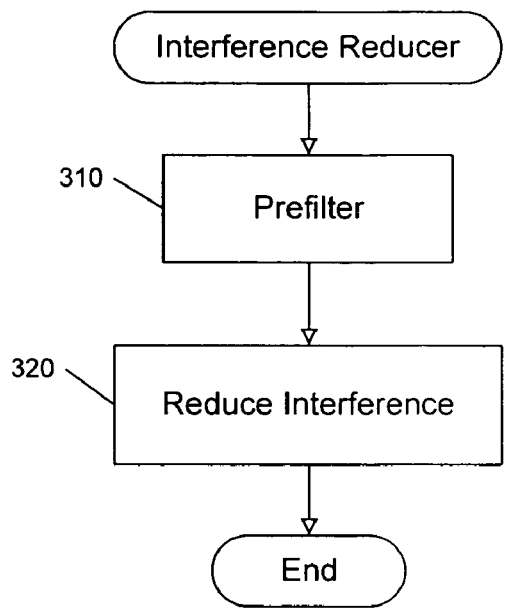
FIG. 3 is a flowchart of operations that may be performed by an interference reducer, such as the interference reducer of FIGS. 1 and/or 2 according to exemplary embodiments of the present invention.

FIG. 3 is a flowchart of operations that may be performed by an interference reducer including a prefilter, according to some embodiments of the present invention. These operations may be performed by the interference reducer 170a and/or 170b of FIG. 1, or these operations may be provided at least partially separate therefrom.

In particular, referring to FIG. 3, at Block 310, a prefiltering function is applied to the signals using frequency $f'_U$ that are received from the second radiotelephones 120b in terrestrial mode at the ancillary terrestrial component(s) 140, so that only selected ones of these signals are applied to reduce interference at Block 320.

Many techniques may be used to prefilter the signals. For example, in some embodiments, randomly or pseudo-randomly selected signals using frequency $f'_U$ or a percentage of the signals from the second radiotelephones 120b based on location measures of the radiotelephones 120b, may be prefiltered and not used for interference cancellation. However, in other embodiments, signals are prefiltered based on a likelihood, or maximum likelihood, that these signals will not cause interference with the return link signals fu from the first radiotelephones 120a in satellite mode. Embodiments of such a prefiltering technique are described, for example, in FIG. 4.

Figure 4:
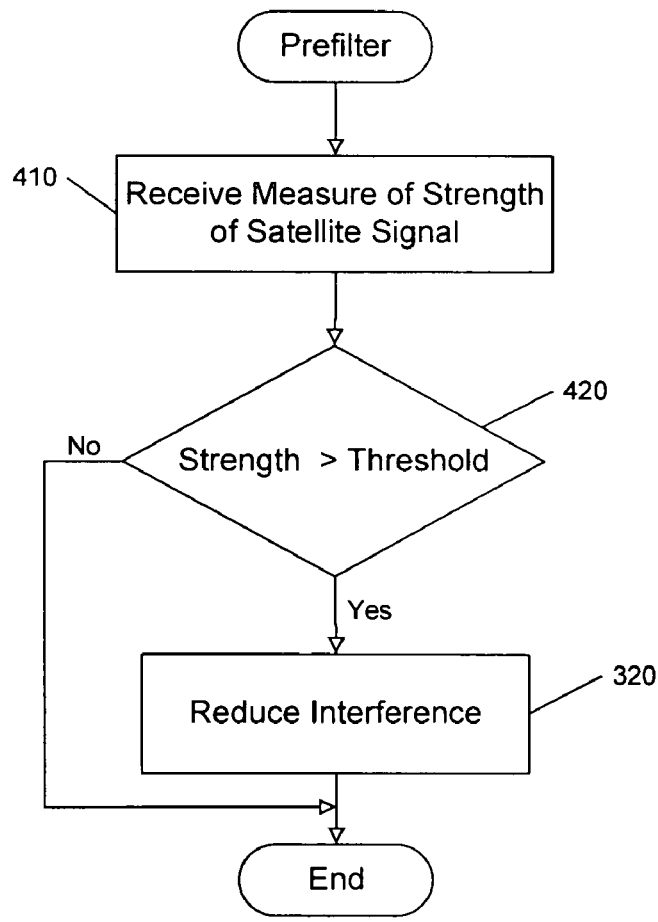
FIG. 4 is a flowchart of operations that may be performed by a prefilter, such as a prefilter of FIG. 3, according to exemplary embodiments of the present invention.

Referring now to FIG. 4, as shown at Block 410, prefiltering may be performed based on a measure of a signal strength of a satellite signal $f_D$ that is received by a second radiotelephone 120b that is operating in terrestrial mode. In particular, it has been recognized according to some embodiments of the present invention that, in order for a second radiotelephone 120b to create a substantive potential interference path 150, the radiotelephone's signal must be able to reach the space-based component 110 at, or above, a predetermined strength. Accordingly, prefiltering of Block 310 of FIG. 3 may be performed based on a measure of the strength of the satellite signal that is received by a second radiotelephone 120b, at Block 410 of FIG. 4. The lower the measure of the strength of the satellite signal, the less likely it may be that sufficient signal from the second radiotelephone will reach the space-based component 110 and create interference.

In some embodiments, the second radiotelephones 120b that are in terrestrial mode can measure one or more components of a downlink (forward link) signal from the space-based component 110 that are received at the second radiotelephones 120b. In some embodiments, one or more of the control channels that are received in the satellite downlink are measured. In other embodiments, one or more forward link traffic channels of the satellite downlink are measured. Combinations and subcombinations of control and/or traffic channels also may be measured. Moreover, as used herein, a measure of signal strength includes a received signal strength and/or a measure of received signal strength such as a quality (bit-error-rate) of the downlink satellite control channel and/or traffic channel.

This measure of strength of the satellite downlink signal(s) may be provided by the second radiotelephone(s) 120b to the associated ancillary terrestrial component(s) 140 as part, for example, of the uplink (return link) signal $f'_U$ from the second radiotelephone(s) 120b to the associated ancillary terrestrial component(s) 140a (i.e., in-band signaling). Alternatively, the downlink satellite signal itself, or a component thereof, may be transferred from the second radiotelephone(s) 120b to the ancillary terrestrial component(s) 140, and a measure of signal strength may be derived at the interference reducer 170a and/or 170b. In still other embodiments, the measure of signal strength, the downlink signal and/or a component thereof, may be transferred to the interference reducer 170a and/or 170b via the space-based component 110.

In any event, the prefiltering system/method receives a measure of the strength of the satellite signal at Block 410. Then, at Block 420, a determination is made as to whether this strength exceeds a threshold. In some embodiments, the determination is made following an integration (smoothing) period during which an average measure of satellite received signal is estimated by, for example, a second radiotelephone 120b. It will be understood that the threshold can be a static and/or dynamic threshold that may vary, for example, as the number of second radiotelephones 120b increases or decreases. It will also be understood that the threshold can depend on an interference monitoring system and/or method such as, for example, those described in the above cited Published U.S. Patent Application No. U.S. 2003/0054814 to Karabinis et al., entitled Systems and Methods for Monitoring Terrestrially Reused Satellite Frequencies to Reduce Potential Interference; and/or U.S. 2003/0073436 to Karabinis et al., entitled Additional Systems and Methods for Monitoring Terrestrially Reused Satellite Frequencies to Reduce Potential Interference. As shown at Block 420, if the satellite downlink signal strength as measured by a given second radiotelephone 120b exceeds the threshold, then a measure of the signal that is radiated by that given second radiotelephone 120b in order to communicate with the ancillary terrestrial component 140 is provided to the interference reducer, so that interference may be reduced at Block 320. If not, then the signal radiated by the given second radiotelephone 120b in order to communicate with the ancillary terrestrial component 140 may be "filtered-out" and not be provided to the interference reducer to be used for interference reducing, thereby reducing a loading of the interference reducer.

Accordingly, prefiltering is used to selectively determine whether or not an uplink signal from a radiotelephone that uses and/or reuses a satellite-band frequency is used for interference reduction/cancellation. In some embodiments, if the uplink signal will not contribute significantly to interference at the space-based component, the uplink signal may be discarded (prefiltered) and not used for interference reduction. A loading and/or complexity on the interference canceller may thereby be reduced, while still maintaining acceptable levels of interference reduction.

In some embodiments, the signals received by ATC 140 that satisfy a prefiltering requirement (such as the prefiltering requirement 420 of FIG. 4) may be sent to the interference canceller (interference reducer) before and/or after demodulation, de-spreading and/or regeneration by the ATC 140 and/or by any other infrastructure element(s) operatively connected to ATC 140. In other embodiments, a signal that is received by ATC 140 and satisfies a prefiltering requirement (such as the prefiltering requirement 420 of FIG. 4) may be de-spread and regenerated by ATC 140 and/or by any other infrastructure element(s) operatively connected to ATC 140, and a regenerated measure of the signal may be re-spread before it is used by the interference canceller (interference reducer). The re-spreading may take place at the ATC 140 and/or at any other infrastructure element(s) operatively connected with ATC 140, at gateway 160b, and/or at the interference canceller (interference reducer). The re-spreading can comprise forming a signal that is identical (or substantially identical) at the chip level and/or at the symbol level, to a signal that has been transmitted by a radioterminal communicating with ATC 140 and/or SBC 110. In some embodiments, such as in embodiments relating to CDMA systems and methods, the interference canceller 170a, 170b (interference reducer) may be operatively configured to process an input signal, such as input signal 142, at a chipping rate. In other embodiments, the interference canceller (interference reducer) may be operatively configured to process an input signal, such as input signal 142, at a symbol rate (after de-spreading has occurred). It will be understood by those of skill in the art, that the interference canceller (interference reducer) of FIG. 2 relates to a data-directed embodiment in that the "Error" quantity is formed by using the output of the "decision making stage." In other embodiments, where an a priori known to the receiver transmitted data sequence and/or chip sequence is available (such as a "training sequence" and/or a "pilot sequence") the a priori known sequence may be used by the interference canceller (interference reducer) instead of, and/or in combination with, the output of the "decision making stage" to derive an error quantity and/or an error sequence.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A satellite radiotelephone system comprising:
a space-based component that is configured to receive wireless communications from a plurality of first radiotelephones in a satellite footprint over a satellite radiotelephone frequency band;
an ancillary terrestrial network that is configured to receive/transmit wireless communications from/to a plurality of second radiotelephones in the satellite footprint over the satellite radiotelephone frequency band, the space-based component also receiving the wireless communications from the second radiotelephones and/or the ancillary terrestrial network in the satellite footprint over the satellite radiotelephone frequency band as interference along with the wireless communications that are received from the first radiotelephones in the satellite footprint over the satellite radiotelephone frequency band; and
an interference reducer that is responsive to the space-based component and to the ancillary terrestrial network, and that is configured to reduce the interference in the wireless communications that are received by the space-based component from the first radiotelephones in the satellite footprint over the satellite radiotelephone frequency band, using the wireless communications that are received by the ancillary terrestrial network from selected ones of the second radiotelephones in the satellite footprint over the satellite radiotelephone frequency band and/or the wireless communications that are transmitted by the ancillary terrestrial network to at least some of the second radiotelephones,
wherein the second radiotelephones are closer to the ancillary terrestrial network than to the space-based component such that the wireless communications from the second radiotelephones are received by the ancillary terrestrial network prior to reception by the space based component, and wherein the interference reducer is configured to generate at least one delayed replica of the wireless communications from the selected ones of the second radiotelephones that are received by the ancillary terrestrial network and/or at least one delayed replica of the wireless communications that are transmitted by the ancillary terrestrial network to at least some of the second radiotelephones and to subtract the delayed replica (s) of the wireless communications from the wireless communications that are received from the space-based component.

2. A satellite radiotelephone system according to claim 1 wherein the interference reducer comprises a prefilter that is configured to determine the selected ones of the second radiotelephones.

3. A satellite radiotelephone system according to claim 2 wherein the prefilter is configured to determine the selected ones of the second radiotelephones based on a measure of signal strength of wireless signals that are received by the plurality of second radiotelephones from the space-based component.

4. A satellite radiotelephone system according to claim 3 in combination with the plurality of second radiotelephones wherein the second radiotelephones are configured to transmit to the ancillary terrestrial network and/or the space-based component, the measure of signal strength of wireless signals that are received by the plurality of second radiotelephones from the space-based component.

5. A satellite radiotelephone system according to claim 4 wherein the ancillary terrestrial network is configured to transmit to the interference reducer signals received by the ancillary terrestrial network from the selected ones of the second radiotelephones, before and/or after demodulation, de-spreading and/or regeneration of the signals by the ancillary terrestrial network.

6. A satellite radiotelephone system according to claim 5 wherein the interference reducer is configured re-modulate and/or re-spread the signals of the selected ones of the second radiotelephones that are received by the interference reducer from the ancillary terrestrial network.

7. A satellite radiotelephone system according to claim 6 wherein the interference reducer is configured to re-spread the signals at the chip level and/or at the symbol level.

8. A satellite radiotelephone system according to claim 3 wherein the prefilter is configured to determine the selected ones of the second radiotelephones based on a measure of signal strength of wireless signals that are received by the plurality of second radiotelephones from the space-based component exceeding a fixed and/or variable threshold.

9. A satellite radiotelephone system according to claim 2 wherein the prefilter is configured to determine the selected ones of the second radiotelephones based on a random or pseudo-random selection, a percentage of the plurality of second radiotelephones satisfying a geographic criterion and/or a likelihood that that the wireless communications that are received by the space-based component from the second radiotelephones will cause interference with the wireless communications that are received by the space-based component from the first radiotelephones.

10. A satellite radiotelephone system according to claim 1 wherein the interference reducer comprises an adaptive interference reducer.

11. A satellite radiotelephone system according to claim 1 further comprising a gateway that communicates with the space-based component and with the ancillary terrestrial network and wherein the interference reducer is at least partially included in the gateway.

12. An interference reducer for a satellite radiotelephone system, the satellite radiotelephone system comprising a space-based component that is configured to receive wireless communications from a plurality of first radiotelephones in a satellite footprint over a satellite radiotelephone frequency band and an ancillary terrestrial network that is configured to receive wireless communications from a plurality of second radiotelephones in the satellite footprint over the satellite radiotelephone frequency band and/or transmit wireless communications to the plurality of second radiotelephones in the satellite footprint over the satellite radiotelephone frequency band, the space-based component also receiving the wireless communications from the second radiotelephones and/or from the ancillary terrestrial network in the satellite footprint over the satellite radiotelephone frequency band as interference along with the wireless communications that are received from the first radiotelephones in the satellite footprint over the satellite radiotelephone frequency band, the interference reducer comprising:

an electronics system that is responsive to the space-based component and to the ancillary terrestrial network, and that is configured to reduce the interference in the wireless communications that are received by the space-based component from the first radiotelephones in the satellite footprint over the satellite radiotelephone frequency band, using the wireless communications that are received by the ancillary terrestrial network from selected ones of the second radiotelephones in the satellite footprint over the satellite radiotelephone frequency band and/or the wireless communications that are transmitted by the ancillary terrestrial network to at least some of the second radiotelephones in the satellite footprint over the satellite radiotelephone frequency band, wherein the second radiotelephones are closer to the ancillary terrestrial network than to the space-based component such that the wireless communications from the second radiotelephones are received by the ancillary terrestrial network prior to reception by the space based component. and wherein the interference reducer is further configured to generate at least one delayed replica of the wireless communications from the selected ones of the second radiotelephones that are received by the ancillary terrestrial network and/or at least one delayed replica of the wireless communications that are transmitted by the ancillary terrestrial network to at least some of the second radiotelephones and to subtract the delayed replica(s) of the wireless communications from the wireless communications that are received from the space-based component.

13. An interference reducer according to claim 12 further comprising:

a prefilter that is configured to determine the selected ones of the second radiotelephones.

14. An interference reducer according to claim 13 wherein the prefilter is configured to determine the selected ones of the second radiotelephones based on a measure of signal strength of wireless signals that are received by the plurality of second radiotelephones from the space-based component.

15. An interference reducer according to claim 14 wherein the interference reducer is further configured to receive, from the plurality of second radiotelephones via the ancillary terrestrial network and/or the space-based component, the measure of signal strength of wireless signals that are received by the plurality of second radiotelephones from the space-based component.

16. An interference reducer according to claim 15 wherein the interference reducer is configured to receive from the ancillary terrestrial network signals associated with the selected ones of the second radiotelephones, before and/or after demodulation, de-spreading and/or regeneration of the signals by the ancillary terrestrial network.

17. An interference reducer according to claim 16 wherein the interference reducer is further configured to re-modulate and/or re-spread the signals of the selected ones of the second radiotelephones that are received by the interference reducer from the ancillary terrestrial network.

18. An interference reducer according to claim 17 wherein the interference reducer is configured to re-spread the signals at the chip level and/or at the symbol level.

19. An interference reducer according to claim 14 wherein the prefilter is configured to determine the selected ones of the second radiotelephones based on a measure of signal strength of wireless signals that are received by the plurality of second radiotelephones from the space-based component exceeding a fixed and/or variable threshold.

20. An interference reducer according to claim 13 wherein the prefilter is configured to determine the selected ones of the second radiotelephones based on a random or pseudo-random selection, a percentage of the plurality of second radiotelephones based on location of the radiotelephones and/or a likelihood that the wireless communications that are received by the space-based component from the second radiotelephones will cause interference with the wireless communications that are received by the space-based component from the first radiotelephones.

21. An interference reducer according to claim 12 wherein the interference reducer comprises an adaptive interference reducer.

22. An interference reducer according to claim 12 wherein the satellite radiotelephone system further comprises a gateway that communicates with the space-based component and with the ancillary terrestrial network and wherein the interference reducer is at least partially included in the gateway.

23. An ancillary terrestrial network for a satellite radiotelephone system, the satellite radiotelephone system comprising a space-based component that is configured to receive wireless communications from a plurality of first radiotelephones in a satellite footprint over a satellite radiotelephone frequency band, the ancillary terrestrial network comprising:

a plurality of ancillary terrestrial components that are configured to receive/transmit wireless communications from/to a plurality of second radiotelephones in the satellite footprint over the satellite radiotelephone frequency band, the space-based component also receiving the wireless communications from the second radiotelephones and/or the ancillary terrestrial network in the satellite footprint over the satellite radiotelephone frequency band as interference along with the wireless communications that are received from the first radiotelephones in the satellite footprint over the satellite radiotelephone frequency band;

the satellite radiotelephone system further comprising an interference reducer that is responsive to the space-based component and to the ancillary terrestrial network, and that is configured to reduce the interference in the wireless communications that are received by the space-based component from the first radiotelephones in the satellite footprint over the satellite radiotelephone frequency band, using the wireless communications that are received by the ancillary terrestrial network from selected ones of the second radiotelephones in the satellite footprint over the satellite radiotelephone frequency band and/or the wireless communications that are transmitted by the ancillary terrestrial network to at least some of the second radiotelephones; and the ancillary terrestrial network being further configured to transmit, to the interference reducer, a measure of signal strength of wireless signals that are received by the plurality of second radiotelephones from the space-based component, wherein the ancillary terrestrial network is closer to the second radiotelephones than is the space-based component such that the wireless communications from the second radiotelephones are received by the ancillary terrestrial network prior to reception by the space based component, and wherein the interference reducer is configured to generate at least one delayed replica of the wireless communications from the selected ones of the second radiotelephones that are received by the ancillary terrestrial network and to subtract the delayed replica of the wireless communications from the selected ones of the second radiotelephones that are received by the ancillary terrestrial network from the wireless communications that are received from the space-based component.

24. An ancillary terrestrial network according to claim 23 wherein the ancillary terrestrial network is further configured to transmit to the interference reducer, signals received by the ancillary terrestrial network from the selected ones of the second radiotelephones, before and/or after demodulation, de-spreading and/or regeneration of the signals by the ancillary terrestrial network.

25. An ancillary terrestrial network according to claim 23 wherein the interference reducer is at least partially included in the ancillary terrestrial network.

26. A satellite radiotelephone communication method comprising:
receiving wireless communications at a space-based component from a plurality of first radiotelephones in a satellite footprint over a satellite radiotelephone frequency band;
receiving/transmitting wireless communications at an ancillary terrestrial network from/to a plurality of second radiotelephones in the satellite footprint over the satellite radiotelephone frequency band, the space-based component also receiving the wireless communications from the second radiotelephones and/or the ancillary terrestrial network in the satellite footprint over the satellite radiotelephone frequency band as interference along with the wireless communications that are received from the first radiotelephones in the satellite footprint over the satellite radiotelephone frequency band; and
reducing the interference in the wireless communications that are received by the space-based component from the first radiotelephones in the satellite footprint over the satellite radiotelephone frequency band, using the wireless communications that are received by the ancillary terrestrial network from selected ones of the second radiotelephones in the satellite footprint over the satellite radiotelephone frequency band and/or the wireless communications that are transmitted by the ancillary terrestrial network to at least some of the second radiotelephones,
wherein the second radiotelephones are closer to the ancillary terrestrial network than to the space-based component such that the wireless communications from the second radiotelephones are received by the ancillary terrestrial network prior to reception by the space based component, and wherein reducing the interference comprises generating at least one delayed replica of the wireless communications from the selected ones of the second radiotelephones that are received by the ancillary terrestrial network and/or at least one delayed replica of the wireless communications that are transmitted by the ancillary terrestrial network to at least some of the second radiotelephones and subtracting the delayed replica(s) of the wireless communications from the wireless communications that are received from the space-based component.

27. A method according to claim 26 wherein reducing the interference comprises prefiltering to determine the selected ones of the second radiotelephones.

28. A method according to claim 27 wherein prefiltering comprises determining the selected ones of the second radiotelephones based on a measure of signal strength of wireless signals that are received by the plurality of second radiotelephones from the space-based component.

29. A method according to claim 28 further comprising:
transmitting from the second radiotelephones to the ancillary terrestrial network and/or the space-based component, the measure of signal strength of wireless signals that are received by the plurality of second radiotelephones from the space-based component.

30. A method according to claim 29 further comprising transmitting from the ancillary terrestrial network to the interference reducer signals received by the ancillary terrestrial network from the selected ones of the second radiotelephones, before and/or after demodulation, despreading and/or regeneration of the signals by the ancillary terrestrial network.

31. A method according to claim 30 wherein reducing the interference further comprises re-modulating and/or re-spreading the signals of the selected ones of the second radiotelephones that are received from the ancillary terrestrial network.

32. A method according to claim 30 wherein reducing the interference further comprises re-spreading the signals at the chip level and/or at the symbol level.

33. A method according to claim 28 wherein prefiltering comprises determining the selected ones of the second radiotelephones based on a measure of signal strength of wireless signals that are received by the plurality of second radiotelephones from the space-based component exceeding a fixed and/or variable threshold.

34. A method according to claim 27 wherein prefiltering comprises determining the selected ones of the second radiotelephones based on a random or pseudo-random selection, a percentage of the plurality of second radiotelephones satisfying a geographic criterion and/or a likelihood that that the wireless communications that are received by the space-based component from the second radiotelephones will cause interference with the wireless communications that are received by the space-based component from the first radiotelephones.

35. A method according to claim 26 wherein reducing the interference comprises performing adaptive interference reducing.

36. A method according to claim 26 further comprising a gateway that communicates with the space-based component and with the ancillary terrestrial network and wherein reducing the interference is at least partially performed in the gateway.

37. An interference reducing method for a satellite radiotelephone system, the satellite radiotelephone system comprising a space-based component that is configured to receive wireless communications from a plurality of first radiotelephones in a satellite footprint over a satellite radiotelephone frequency band and an ancillary terrestrial network that is configured to receive wireless communications from a plurality of second radiotelephones in the satellite footprint over the satellite radiotelephone frequency band and/or transmit wireless communications to the plurality of second radiotelephones in the satellite footprint over the satellite radiotelephone frequency band, the space-based component also receiving the wireless communications from the second radiotelephones and/or from the ancillary terrestrial network in the satellite footprint over the satellite radiotelephone frequency band as interference along with the wireless communications that are received from the first radiotelephones in the satellite footprint over the satellite radiotelephone frequency band, the interference reducing method comprising:

reducing the interference in the wireless communications that are received by the space-based component from the first radiotelephones in the satellite footprint over the satellite radiotelephone frequency band, using the wireless communications that are received by the ancillary terrestrial network from selected ones of the second radiotelephones in the satellite footprint over the satellite radiotelephone frequency band and/or the wireless communications that are transmitted by the ancillary terrestrial network to at least some of the second radiotelephones in the satellite footprint over the satellite radiotelephone frequency bands, wherein the second radiotelephones are closer to the ancillary terrestrial network than to the space-based component such that the wireless communications from the second radiotelephones are received by the ancillary terrestrial network prior to reception by the space based component and wherein reducing the interference further comprises generating at least one delayed replica of the wireless communications from the selected ones of the second radiotelephones that are received by the ancillary terrestrial network and/or at least one delayed replica of the wireless communications that are transmitted by the ancillary terrestrial network to at least some of the second radiotelephones and subtracting the delayed replica(s) of the wireless communications from the wireless communications that are received from the space-based component.

38. A method according to claim 37 wherein reducing the interference comprises prefiltering to determine the selected ones of the second radiotelephones.

39. A method according to claim 38 wherein prefiltering comprises determining the selected ones of the second radiotelephones based on a measure of signal strength of wireless signals that are received by the plurality of second radiotelephones from the space-based component.

40. A method according to claim 38 wherein prefiltering comprises determining the selected ones of the second radiotelephones based on a random or pseudo-random selection, a percentage of the plurality of second radiotelephones based on location of the radiotelephones and/or a likelihood that the wireless communications that are received by the space-based component from the second radiotelephones will cause interference with the wireless communications that are received by the space-based component from the first radiotelephones.

41. A method according to claim 37 further comprising receiving from the plurality of second radiotelephones via the ancillary terrestrial network and/or the space-based component, the measure of signal strength of wireless signals that are received by the plurality of second radiotelephones from the space-based component.

42. A method according to claim 41 wherein reducing the interference comprises receiving from the ancillary terrestrial network signals associated with the selected ones of the second radiotelephones, before and/or after demodulation, despreading and/or regeneration of the signals by the ancillary terrestrial network.

43. A method according to claim 42 wherein reducing the interference further comprises re-modulating and/or re-spreading the signals of the selected ones of the second radiotelephones that are received by the interference reducer from the ancillary terrestrial network.

44. A method according to claim 43 wherein reducing the interference further comprises re-spreading the signals at the chip level and/or at the symbol level.

45. A method according to claim 37 wherein prefiltering comprises determining the selected ones of the second radiotelephones based on a measure of signal strength of wireless signals that are received by the plurality of second radiotelephones from the space-based component exceeding a fixed and/or variable threshold.

46. A method according to claim 37 wherein reducing the interference comprises performing adaptive interference reducing.

47. A method according to claim 37 further comprises a gateway that communicates with the space-based component and with the ancillary terrestrial network and wherein reducing the interference is at least partially performed in the gateway.

* * * * *